March 25, 1924.　　　　　　　　　　　　　　　1,488,222
N. R. THIBERT
METAL WORKING TOOL
Filed March 4, 1922　　　　　2 Sheets-Sheet 1
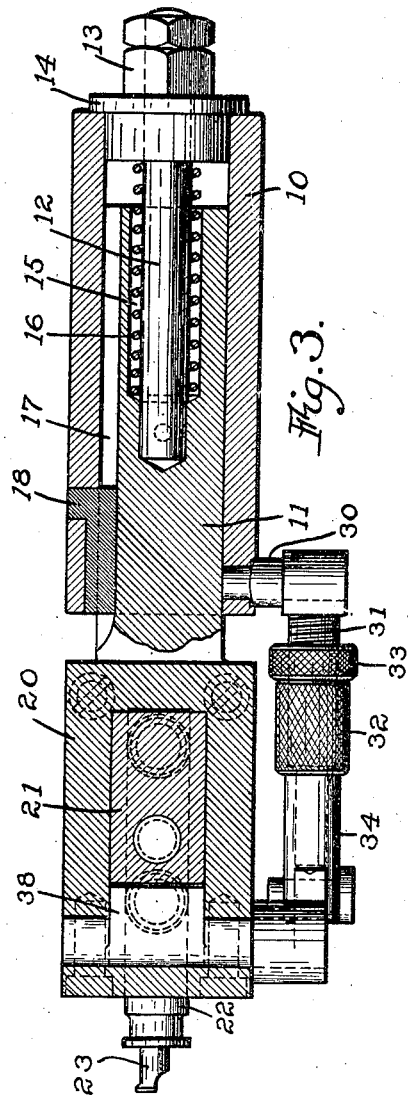
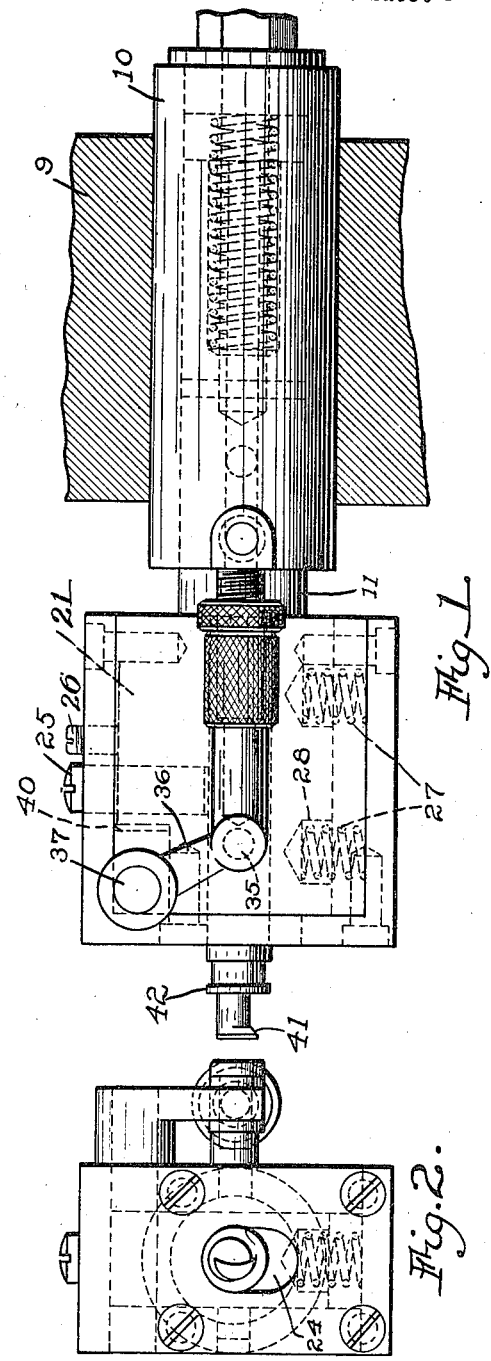
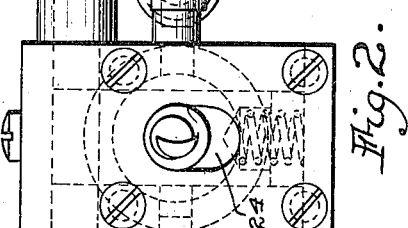
Inventor
N. R. Thibert
By Attorneys, March 25, 1924.

N. R. THIBERT 1,488,222

METAL WORKING TOOL

Filed March 4, 1922

Inventor
N. R. Thibert

By Attorneys.

Patented Mar. 25, 1924.

1,488,222

UNITED STATES PATENT OFFICE.

NAPOLEON R. THIBERT, OF WORCESTER, MASSACHUSETTS.

METAL-WORKING TOOL.

Application filed March 4, 1922. Serial No. 541,252.

*To all whom it may concern:*

Be it known that I, NAPOLEON R. THIBERT, a citizen of the United States, residing at Worcester, in the county of Worcester and State of Massachusetts, have invented a new and useful Metal-Working Tool, of which the following is a specification.

This invention relates to a tool or rather tool holder adapted to be used on an automatic machine for the purpose of performing circular cutting operations, especially internal ones, on a piece of work, either the work or the tool being rotated. Such tools can be used on machines of the type of automatic screw machines and for the purpose of finishing the interior of nuts and similar objects, but they have a wide range of use.

The principal objects of this invention are to provide a tool holder adapted to be mounted on a movable part of the machine with a head for supporting the tool, said head being capable of yielding when the tool comes into contact with the work, with means whereby the yielding motion moves the tool laterally into contact with the work; to provide improved mechanical means for causing this lateral motion and adjusting it to get any desired amount of throw; and to provide other improvements in details of construction and combinations of parts as will appear hereinafter.

Reference is to be had to the accompanying drawings, in which—

Fig. 1 is a plan of a tool holder and tool constructed in accordance with this invention;

Fig. 2 is an end elevation of the same;

Fig. 3 is a longitudinal central sectional view, and

Figure 4:
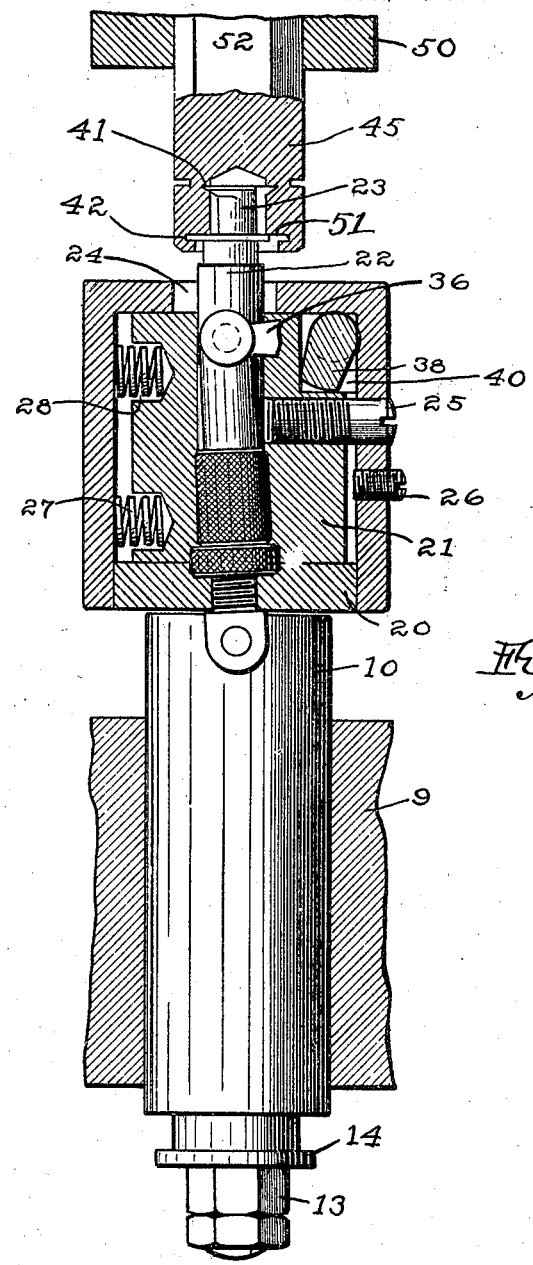
Fig. 4 is a horizontal central sectional view showing the parts in cutting position.

I have shown the invention in a form comprising a cylindrical support 10 mounted on a member 9 of the machine arranged so that it reciprocates in a longitudinal direction. The support 10, therefore, in operation is carried back and forth by the operation of any well-known machine and in the direction of its axis. It has passing through it a longitudinal passage concentric with its exterior in which is located a shank 11. This shank is provided at its rear end with a bolt 12 having a nut and check nut 13 on its end which projects through an opening in the end of the support 10 and is adapted to abut against a disc 14 which is held fixedly in said opening. This nut and check nut can be adjusted on the bolt and serve as a limit stop. Inside the shank 11 is a longitudinal cylindrical recess 15 in which is a coil spring 16 bearing against the end of the disc 14 at one end and on the bottom of the recess 15 at the other. This surrounds the bolt and yieldingly forces the shank to the left in Figs. 1 and 3 and brings the nut 13 up against the shank with yielding pressure. The shank is provided with a longitudinal slot 17 and the support with a guide 18 for preventing the rotation of the shank in the support.

This shank extends outwardly beyond the other end of the support 10 and carries upon it a head 20. This I have shown as rectangular in cross-section and of box-like formation having a bottom and top as well as side and end walls. It is machined inside and is provided with a slide 21 adapted to move transversely. Into the slide extends the shank 22 of a tool 23, the tool itself extending out through an oblong opening 24 in the end wall of the head. This shank fits a passage in the slide 21 which is provided with a set screw 25 extending through its wall and through the wall of the head to clamp the shank of the tool in position. I have also shown another set screw 26 which extends through the wall of the head into engagement with the slide to serve as a limiting stop for it.

At the opposite side of the head there is a clearance for the slide and in the place provided there are two coil springs 27 extending into recesses 28 in the slide and serving to yieldingly force the slide back against the stop 26 but obviously not preventing motion of the slide away from the stop if actuated positively.

On the support 10 there is a stud 30 projecting radially therefrom. Pivotally mounted on this stud is a screw 31 provided with an adjusting nut 32 and a check nut 33 both knurled to allow hand operation. Mounted to slide on the end of this screw which is reduced to form an end without a screw thread, is a slide 34 having a passage through it longitudinally for the unthreaded end of the screw 31. This is pivoted by a stud 35 to an arm 36 which is fixed to an oscillating stud or shaft 37 projecting out through one corner of the head 20 parallel with the stud 30. This stud 37 is mounted in suitable bearings on the head at its opposite sides and at the opposite ends of the stud. Inside the head the stud is provided with a cam 38 located in a notch 40 which is cut out of the corner of the slide 21. This cam is in the form of a projection extending from the stud 37 at an angle to the arm 36 and bearing on a side of the notch which is parallel with the longitudinal dimension of the whole device. It will be understood that when the arm 36 is turned on its axis the cam 38 will swing with it positively and force the slide 21 over against the springs 27. This moves the tool 23 laterally as stated.

Any desired shape of tool can be employed but I have shown a tool which has a cutting edge 41 for chamfering the end of the opening through the end of the nut blank and also provided with a cutting edge 42 spaced back of the cutting edge 41 for cutting a flat circular groove in the outer face of the nut blank 45. This groove, of course, can be used for any purpose but I have shown it in a form in which it is suitable for the location of a spring to convert the nut into a lock nut.

In the operation of the device the nut blank 45 is held in a rotating member 50 and the support 10 is held by the reciprocating member 9. It will be understood, of course, that the blank could be left stationary and the support 10 could be rotated with the same results. When the tool is moved up into the interior of the work centrally the head of the tool will strike a solid surface 51 of the rod 52 on which the nut is formed. The result of that action is to stop the further forward motion of the tool and consequently of the member 20 which previously advanced with the support 10. The support 10 continues to advance alone as there is no resistance to oppose it except the springs 27. The result is that the stud 30 is forced forward and the stud 35 swings the arm 36 around as soon as the nut 32 engages the end of the slide 34. This operates the cam 38 and forces the slide 21 over in opposition to the springs 27 and moves the cutting part of the tool sideways into position to perform the desired operations on the work. The feed of the tool into the work is proportioned therefore to the speed of the motion of the support 10 in a direction at right angles to the feed and the eventual depth of the cut is regulated by the position of the nut 32. If any lost motion is desired that can be provided for by adjusting the nut back on the slide 34.

Although I have illustrated and described only a single form of the invention and shown it as applied to the manufacture of a particular article, I am aware of the fact that modifications can be made therein by any person skilled in the art and that the invention can be adapted to the manufacture of various articles without departing from the scope of the invention as expressed in the claims. Therefore, I do not wish to be limited in these respects but what I do claim is:—

1. In an internal metal working device, the combination of a support mounted to reciprocate, a head yieldingly carried by the support and movable forward with the support until it meets resistance and then capable of stopping without stopping the motion of the support, a slide movable laterally in the head, the head having means for guiding the slide, a tool movably mounted on the slide and adapted to enter the interior of a blank to be finished, and oscillatable means within the head for moving the slide sideways when the longitudinal motion of the head is stopped.

2. In a metal cutting device, the combination of a reciprocable head, a slide movable thereon in a direction at an angle to the direction of reciprocation of the head, a shaft mounted on the head, a cam on the shaft adapted to engage said slide for moving it in the head, an arm on said shaft, a support on which the head is carried, and a link connecting said support with said arm for swinging the arm when there is a relative motion between the support and head.

3. In a metal working device, the combination of a reciprocable support, a head carried thereby, a slide movable laterally on the head and adapted to carry a tool projecting therefrom through the end of the head, and means comprising a pivoted arm and cam whereby when the forward motion of the tool stops the slide will be moved laterally with the tool.

4. In a metal working device, the combination of a head, a reciprocating support for said head, yielding means for permitting the support to move forward while the head remains stationary after it meets resistance, a slide laterally movable in the head, a transverse shaft journalled on the head having a cam projecting therefrom and an arm connected with the reciprocating support for moving the slide laterally when the support moves toward the head, and a tool carried by the slide.

5. In a metal cutting device, the combination of a reciprocable head, a slide movable thereon in a direction at an angle to the direction of reciprocation of the head, a shaft mounted on the head, a cam on the shaft adapted to engage said slide for moving it in the head, springs in the head for opposing the action of the cam, an arm on said shaft outside the head, a support on which the head is carried, and a link connecting said support with said arm for swinging the arm when there is a relative motion between the support and head.

6. In a metal cutting device, the combination of a support, a reciprocable head thereon, a slide in the head movable thereon in a direction transverse to the direction of reciprocation of the head, a shaft mounted on the head, a cam on the shaft arranged to move said slide in the head, an arm on said shaft, and a link connecting said support with said arm for swinging the arm when there is a relative motion between the support and head.

7. In a metal cutting device, the combination of a support, a head reciprocable thereon, a slide movable on the head in a direction at an angle to the direction of reciprocation of the head, a shaft mounted on the head, a cam on the shaft adapted to engage said slide for moving it in the head, an arm on said shaft, a link connecting said support with said arm for swinging the arm when there is a relative motion between the support and head, said link comprising a screw and slide slidably connected together, and an adjusting nut on said screw for adjusting the throw of said arm.

8. In a metal cutting device, the combination of a support, a reciprocable head thereon, a slide movable on the head in a direction transverse to the direction of reciprocation of the head, a shaft mounted on the head, a cam on the shaft adapted to move said slide in the head, an arm on said shaft, a screw and a slide slidably connected together and connected with the arm and support respectively.

In testimony whereof I have hereunto affixed my signature.

NAPOLEON R. THIBERT.